(12) United States Patent
Ferrieres et al.

(10) Patent No.: US 9,566,943 B2
(45) Date of Patent: Feb. 14, 2017

(54) METHOD OF MAKING A VEHICLE AVAILABLE AND CORRESPONDING SYSTEM FOR MAKING A VEHICLE AVAILABLE

(71) Applicant: RENAULT S.A.S., Boulogne Billancourt (FR)

(72) Inventors: Lionel Ferrieres, Gif sur Yvette (FR); Eugenie Levallois, Versailles (FR); Jean-Marc Dubois, Tacoignieres (FR)

(73) Assignee: RENAULT s.a.s., Boulogne Billancourt (FR)

(*) Notice: Subject to any disclaimer, the term of this patent is extended or adjusted under 35 U.S.C. 154(b) by 0 days.

(21) Appl. No.: 14/761,464

(22) PCT Filed: Mar. 13, 2014

(86) PCT No.: PCT/FR2014/050576
§ 371 (c)(1),
(2) Date: Jul. 16, 2015

(87) PCT Pub. No.: WO2014/140490
PCT Pub. Date: Sep. 18, 2014

(65) Prior Publication Data
US 2015/0343993 A1    Dec. 3, 2015

(30) Foreign Application Priority Data

Mar. 13, 2013    (FR) ..................... 13 52213

(51) Int. Cl.
*B60R 25/20*    (2013.01)
*B60R 25/04*    (2013.01)
*H04L 29/06*    (2006.01)

(52) U.S. Cl.
CPC .............. *B60R 25/04* (2013.01); *B60R 25/209* (2013.01); *B60R 25/2018* (2013.01); *H04L 63/08* (2013.01)

(58) Field of Classification Search
CPC .... B60R 25/04; B60R 25/209; B60R 25/2018; H04L 63/08
See application file for complete search history.

(56) References Cited

U.S. PATENT DOCUMENTS 6,850,153 B1 * 2/2005 Murakami .......... B60L 11/1816
                                                     235/384
2005/0162260 A1 * 7/2005 Gupte .................. B60R 25/102
                                                    340/426.18
(Continued)

FOREIGN PATENT DOCUMENTS

DE    10339476 B3    5/2005
EP    1977939 A2    10/2008
(Continued)

OTHER PUBLICATIONS

International Search Report issued Jul. 9, 2014 in PCT/FR2014/050576 filed Mar. 13, 2014.
(Continued)

*Primary Examiner* — Yuen Wong
(74) *Attorney, Agent, or Firm* — Oblon, McClelland, Maier & Neustadt, L.L.P.

(57) ABSTRACT

A method of making a vehicle available, including sending a message to unlock at least one vehicle door from a remote vehicle management server, following a user request, the user request having been subject to identification of the user and authorization of use by the user for the vehicle. The method further includes sending a message, independent of the above-mentioned unlocking message, authorizing starting of the vehicle by a control system of the vehicle from the remote vehicle management server.

11 Claims, 3 Drawing Sheets

(56) References Cited

U.S. PATENT DOCUMENTS

Figure 1:
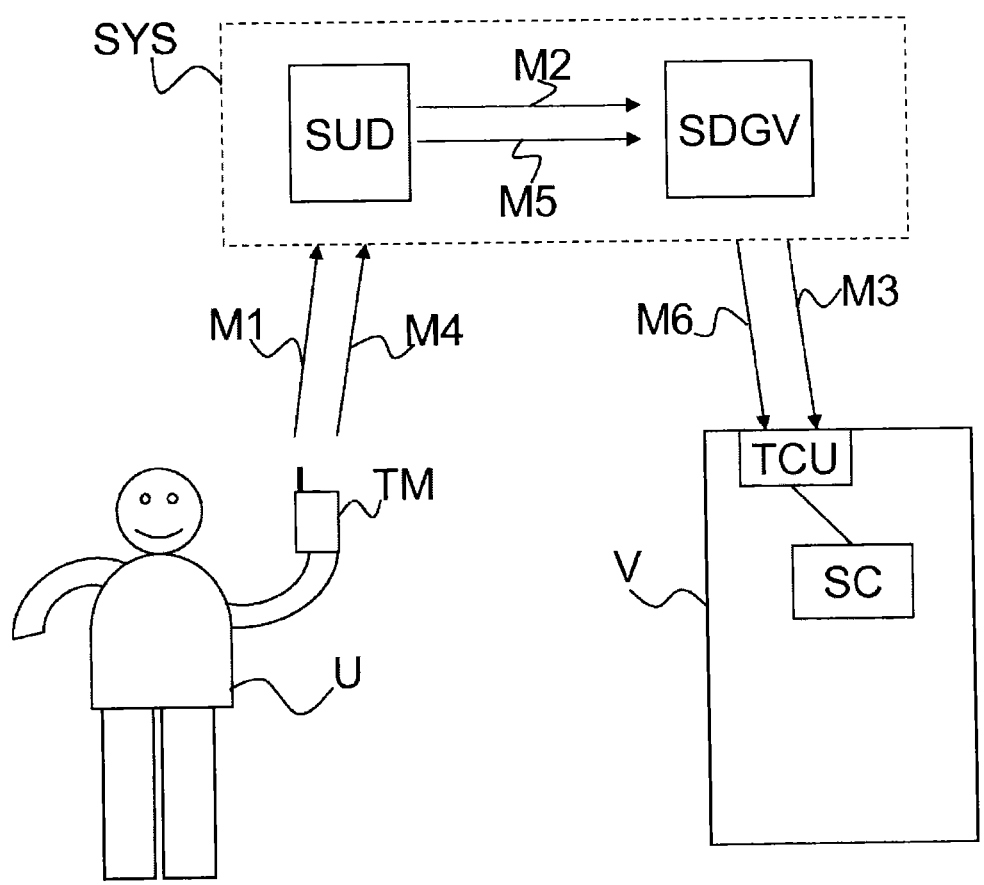

| | | | | |
|---|---|---|---|---|
| 2011/0098877 A1* | 4/2011 | Stahlin | ................... | G08G 1/161 |
| | | | | 701/31.4 |
| 2011/0307375 A1 | 12/2011 | Maney | | |
| 2012/0164989 A1* | 6/2012 | Xiao | ..................... | G07C 5/008 |
| | | | | 455/414.1 |
| 2012/0313796 A1 | 12/2012 | Lee et al. | | |
| 2013/0317693 A1* | 11/2013 | Jefferies | ................. | G07B 15/00 |
| | | | | 701/31.5 |

FOREIGN PATENT DOCUMENTS

| | | |
|---|---|---|
| EP | 2397996 A2 | 12/2011 |
| JP | 2011-44112 A | 3/2011 |
| WO | 2008/044087 A1 | 4/2008 |

OTHER PUBLICATIONS

French Search Report issued Nov. 8, 2013 in FR 1352213 filed Mar. 13, 2013.

* cited by examiner

METHOD OF MAKING A VEHICLE AVAILABLE AND CORRESPONDING SYSTEM FOR MAKING A VEHICLE AVAILABLE

The present invention relates generally to the field of motor vehicles, and more specifically concerns a method for a user to make a vehicle available, notably in the context of a vehicle rental or car-sharing service.

In most vehicle rental or car-sharing services, a user wishing to book a vehicle must retrieve the vehicle key or fob from a service manager renting out or sharing this vehicle, which is restrictive for the user and the manager. It is to be noted that the key or respectively the fob is the usual identifier of the user allowing starting for a key-operated vehicle or respectively a keyless vehicle. This latter type of vehicle uses a fob which is identified by a computer of the vehicle to authorize the starting of the vehicle, which is then performed by pressing a start button.

To remove this brake holding back the more widespread use of vehicle rental and car-sharing services, systems providing for making a car-share or rental vehicle available without the handover of a key or fob have been imagined. This is the case for example for car-sharing systems described in applications JP2011044112 and CN101833729, in which a booking is carried out online via cellphone by using an Internet type public data network. Then the cellphone communicates with the vehicle to identify the user and unlock the vehicle doors.

Nevertheless, these systems exhibit the drawback of requiring equipment that is onboard the vehicle and specific to the rental or car-share setup in order to identify the user, and this is costly and restrictive from the perspective of industrializing such equipment.

Furthermore, this equipment is often visible from the outside and can easily be bypassed to enable the vehicle to be started. This is the case for example when such equipment contains the vehicle fob or when it includes a simple open relay to prevent the vehicle from being started with the ignition key before the user is identified.

French patent application FR1259499 describes a car-sharing system in which a user remotely unlocks the doors of a car-share vehicle by calling upon a remote server from his/her cellphone. This unlock order, once the ignition key is engaged (for a key-operated vehicle) or once the starting authorization is obtained (for a keyless vehicle), provides for starting the vehicle by means of the key or by pressing the start button for keyless vehicles. Furthermore, the remote server must simultaneously identify the user and the car-share vehicle. This system therefore exhibits the drawbacks of not ensuring security of the vehicle between the instant of unlocking the doors and that of starting, and of requiring integration of the car-share service in a vehicle management server, often specific to a vehicle manufacturer.

One of the aims of the invention is to address at least a part of the drawbacks of the prior art by providing a method and a system for making a vehicle available without the handover of a key, which provide a good level of security for the vehicle owner and do not require a specific onboard unit for the car-sharing in addition to the standard TCU (Telematics Control Unit) developed for standard communicating vehicles.

To this end, the invention proposes a method for making a vehicle available, including a step for sending a message allowing the unlocking of at least one door of the vehicle from a remote vehicle management server, in response to a user request, said user request having formed the subject of an identification of said user and of an authorization of use by said user of said vehicle, characterized in that it additionally includes a step for sending a message, independent of said message allowing said unlocking, authorizing the starting of the vehicle by a control system of said vehicle from said remote vehicle management server.

The steps for sending the message allowing said unlocking and the message authorizing the starting of the vehicle are carried out:

either by said remote server which then sends these messages to the vehicle, the user identification and authorization being carried out by this same remote server or by another remote server, or indirectly by a remote server, tasked with identifying and authorizing the user, and which sends said messages to the remote server allowing the remote unlocking and starting authorization by communication with the vehicle.

It is to be noted that in this application, the term "remote" applied to a server means remote from the vehicle and from the user, and the term "unlocking" applies to the electrical unlocking of a vehicle door.

By virtue of the invention, the booking of a car-share vehicle is carried out online for example via a cellphone or a fixed terminal, and without specific car-share-related equipment in the vehicle, the latter not being required to intervene in the identification of the user. Indeed, it is to be noted that an increasing number of recent vehicles are equipped with a telecommunication unit for uploading vehicle-related data to a remote server, but also allowing this remote server to activate certain functions of the vehicle remotely. Thus, the method according to the invention, for making a vehicle available, makes use of service components that are already existing in vehicles not initially intended for car-sharing, thereby facilitating the implementation of this method by individual users.

Unlike in prior-art systems, in the invention, the remote unlocking of the vehicle doors does not allow the starting of the vehicle. This is because the starting of the vehicle requires the vehicle to receive a message other than the message allowing this unlocking, also sent remotely to the vehicle, this other message being said message authorizing the starting of the vehicle. Thus, the user is ensured that the remote unlocking of the vehicle doors, when it is not carried out close to the vehicle, does not make the vehicle available for another person to take it over. Likewise, assuming that the vehicle ignition key or fob is in the glove box of the vehicle when the vehicle is left in car-share mode, the fact that a stranger can grab this key or this fob by forced entry does not allow that person to start the vehicle.

According to an advantageous feature of the method for making a vehicle available according to the invention, the identification and authorization of use are carried out by a remote user server which is separate from said remote vehicle management server, said message allowing the unlocking of at least one door being sent by said remote vehicle management server to said vehicle upon reception of an unlock message sent by said remote user server after a step for processing said user request by said remote user server, said message authorizing the starting of said vehicle being sent by said remote vehicle management server to said vehicle upon reception of an unprotect message sent by said remote user server, said unlock and unprotect messages sent by said remote user server to said remote vehicle management server lacking an identifier of said user.

In this application, "unprotect" means the remote unlocking of the control system, authorizing the starting of the vehicle.

This interface between the remote user server and the remote vehicle management server allows this latter remote server to belong for example to the manufacturer of the vehicle to be car-shared, and allows the remote user server to be a web server developed by the vehicle owner (private individual or service operator). Thus, this feature of the invention encourages the development of car-sharing applications by those who are not specialists in the motor-vehicle field, for example individual users who can thus car-share their vehicle only during slots that suit them.

According to another advantageous feature of the method for making a vehicle available according to the invention, said remote vehicle management server sends said message authorizing the starting of said vehicle only when said remote user server has received from said user a value of a variable parameter relating to said vehicle, and said value corresponds to a value previously recorded by said remote vehicle management server or by said remote user server.

Thus, the starting authorization is given by the control system of an engine of the vehicle only when the user supplies the remote user server with a value relating to the vehicle such as the mileage displayed on the vehicle odometer, or the vehicle fuel level, or the charge level of a traction battery of the vehicle. This provides for re-identifying the user when this authorization is given, and for giving this authorization when the user is close to or even inside the vehicle, since the value to be provided requires viewing the instrument panel of the vehicle. Thus, risks of theft of the vehicle after its doors are unlocked are reduced. "Value relating to the vehicle" is in this case understood to mean a value provided by the vehicle which is therefore possibly a random value displayed on a multimedia screen in the vehicle.

According to another advantageous feature of the method for making a vehicle available according to the invention, said control system of said vehicle authorizes the starting of said vehicle only after a key or a fob of said vehicle is identified, and after said vehicle receives said messages allowing the unlocking of at least one door and authorizing the starting of said vehicle.

According to another advantageous feature of the method for making a vehicle available according to the invention, said remote vehicle management server sends said message authorizing the starting of said vehicle only after a manual opening of a door of said vehicle is detected.

This feature provides for making sure that the user has been able to retrieve the key or fob of the vehicle before authorizing the starting of the vehicle, thereby providing for securing the procedure for making the vehicle available. This detection can be carried out for example by the vehicle which communicates with the remote server via its standard telematics control unit.

The control system authorizing the starting of the vehicle is contained in a computer verifying multiple starting criteria, including the successful identification of the vehicle ignition key or fob, the correct operation of the vehicle security computers, etc. The key or fob is made available to the user of the vehicle to be shared for example in the glove box of the vehicle. By virtue of adding into the starting criteria the reception of two independent messages allowing the unlocking and then the unprotecting of the vehicle, which are sent by the remote vehicle management server, the risks of hacking of the system by emulating one of the starting criteria are reduced.

According to another advantageous feature of the method for making a vehicle available according to the invention, said remote user server does not authorize the release of said vehicle by said user until said remote user server:
  detects the availability of a communication network allowing said vehicle to communicate with said remote vehicle management server,
  and/or receives an inventory validation message from said user.

Thus, when the vehicle is released by the user, i.e. when the user wishes to return the car-shared vehicle, the remote vehicle management server may re-protect the vehicle remotely, after the remote user server has verified that the vehicle is in a good condition. It is to be noted that the user does not necessarily use the same communication network as the standard telematics control unit of the vehicle, and the user might therefore request the release of the vehicle by telephone in a place where the vehicle is not capable of communicating with the remote vehicle management server.

According to another advantageous feature of the method for making a vehicle available according to the invention, said method includes a step prior to the booking of said vehicle by said user, during which said user supplies to said remote user server a value for delaying by a predetermined duration the sending of said message allowing the unlocking of at least one door of the vehicle.

Thus, if the user requests the car-share vehicle to be made available while he/she is thinking of joining the vehicle several minutes later, he/she can delay the unlocking of the vehicle in order to have time to join the vehicle before its doors unlock. This also allows the user to anticipate the waiting time between the sending of a request by telephone to make a vehicle available and the unlocking of the vehicle, due for example to the slowness of the telecommunication network. This also allows the user to make the request for the vehicle to be made available in a place that is far from the vehicle without taking risks, for example if, at the place where the vehicle is parked, the mobile terminal of the user poorly picks up the telecommunication network with which it is compatible. The responsibility for assessing the time that must elapse between the request for making the vehicle available and the unlocking of the vehicle is furthermore thus transferred to the discretion of the user.

According to another advantageous feature of the method for making a vehicle available according to the invention, the step for sending a message allowing the unlocking of at least one door of the vehicle takes place only after a step for determining the distance between the user and said vehicle, and if the distance determined during said determination step is less than a predetermined threshold.

This feature provides for reducing the delay between making the vehicle available to the user and the unlocking of the vehicle, in order to limit the risks of theft of the vehicle or inside the vehicle before the user takes over the vehicle.

According to another advantageous feature of the method for making a vehicle available according to the invention, upon reception by said vehicle of said message allowing the unlocking of at least one door of the vehicle, said vehicle inhibits a visual and/or audible door-opening indicating function.

Thus the unlocking of the vehicle is not indicated to the surroundings, thereby also limiting the risks of theft of the vehicle or inside the vehicle before the user takes over the vehicle.

The invention also relates to a system for making a vehicle available characterized in that it includes means for implementing the method for making a vehicle available according to the invention, said means including:

a remote user server suitable for identifying a user and for authorizing the use of said vehicle by said user upon reception of a user request, and suitable for communicating with a remote vehicle management server, said remote vehicle management server being suitable for sending to said vehicle a message allowing the unlocking of at least one door of said vehicle in response to the reception of an unlock message sent by said remote user server, said remote vehicle management server being suitable for sending to said vehicle a message independent of said message allowing said unlocking, authorizing the starting of said vehicle by a control system of said vehicle, upon reception of an unprotect message sent by the remote user server.

Lastly, the invention relates to a computer program including instructions for implementing the method for making a vehicle available according to the invention, when it is executed on one or more processors.

The system for making a vehicle available according to the invention and the computer program according to the invention exhibit advantages similar to those of the method for making a vehicle available according to the invention.

Figure 2:
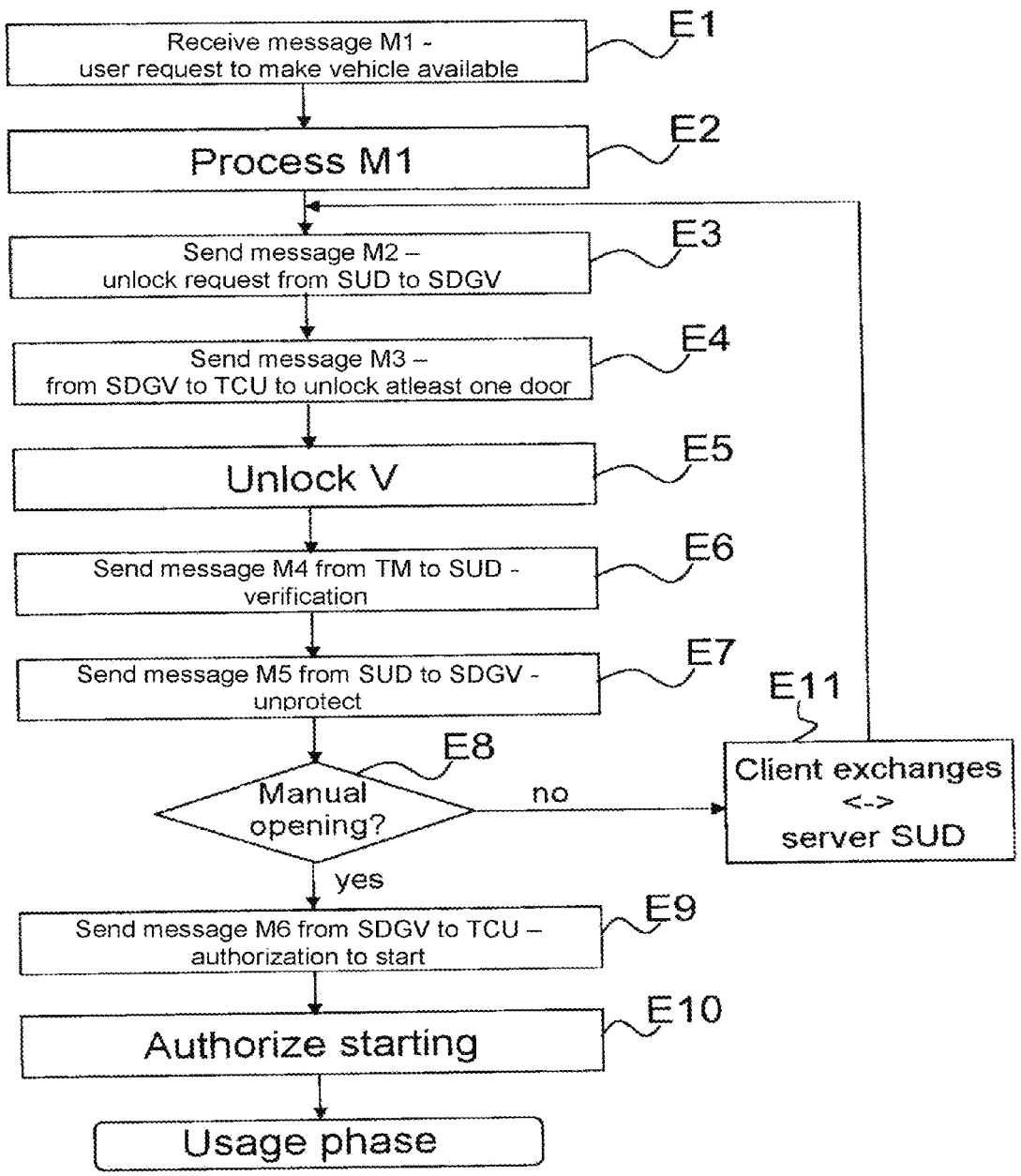
Figure 3:
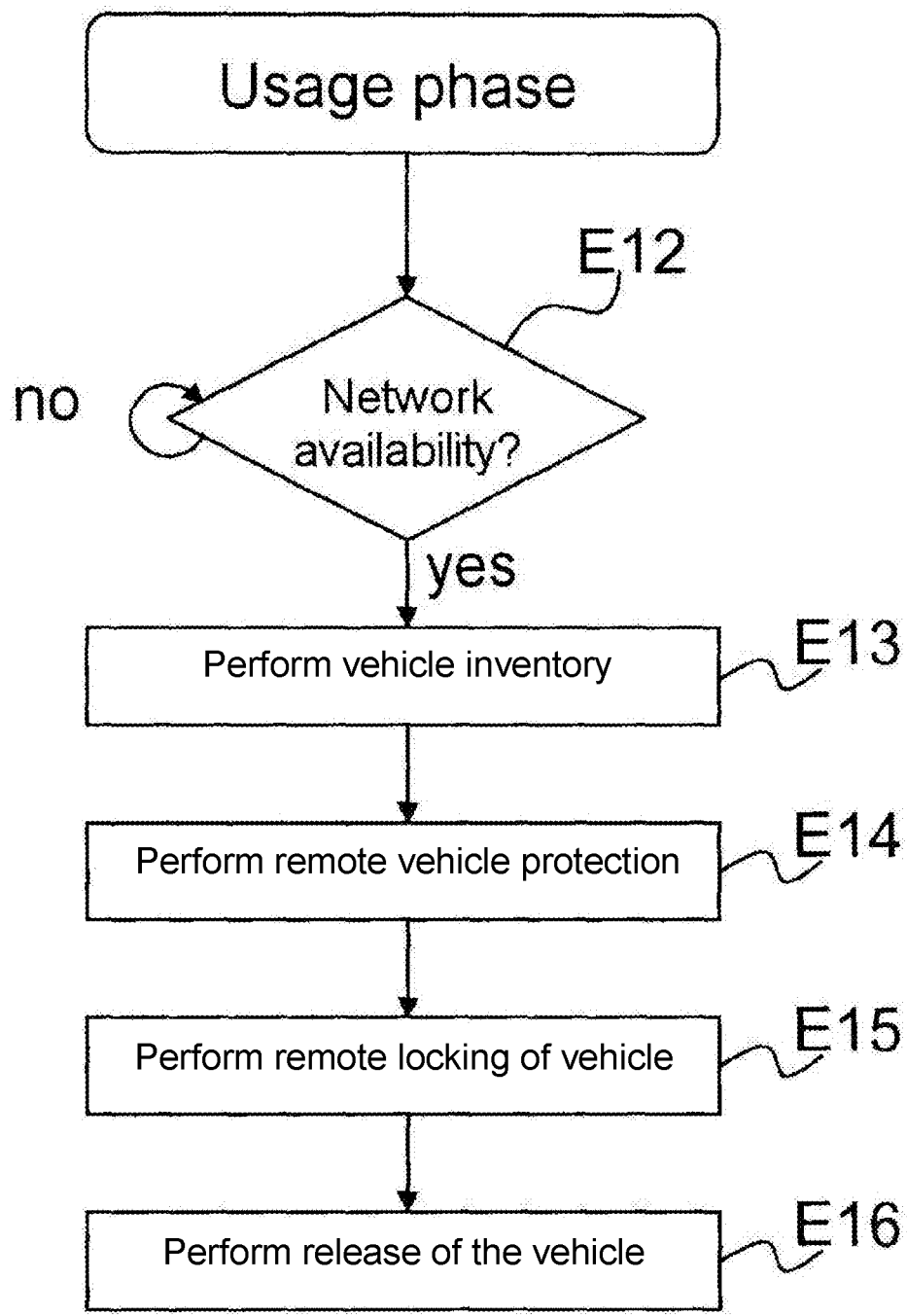

Other features and advantages will become clearer upon reading about a preferred embodiment described with reference to the figures in which:

FIG. 1 represents a system for making a vehicle available according to the invention in this preferred embodiment, FIG. 2 represents steps of a method for making a vehicle available according to the invention in this preferred embodiment, FIG. 3 represents other steps of the method for making a vehicle available according to the invention in this preferred embodiment.

According to a preferred embodiment of the invention represented in FIG. 1, a system SYS for making a vehicle available according to the invention includes two servers, a remote user server SUD dedicated to managing users of the invention, and a remote vehicle management server SDGV dedicated to remotely managing vehicles.

As a variant, the system for making a vehicle available according to the invention includes only one server managing both users and vehicles.

In the main variant embodiment of the invention, the server SUD includes means for identifying and authenticating users such as the user U, as well as means for processing requests sent by these users. The server SUD is for example a web server developed by the owner of a vehicle V (who can be a private individual or a service company), or a server of a car-sharing or car rental company. It includes booking management means for a vehicle or a fleet of vehicles, means for charging users, and means for communicating with one or more servers such as the server SDGV, which is for example a server of a vehicle manufacturer, suitable for communicating remotely with communication devices onboard the vehicles which it manages remotely, such as a communication device TCU of the vehicle V.

The communication means between the server SUD and the server SDGV include in this embodiment a computer interface of the API (Application Programming Interface) type, but other types of interface such as an interface based on short messages or SMS (Short Message Service) messages can also be used. The interface between the server SUD and the server SDGV uses for example an object bus of the CORBA (Common Object Request Broker Architecture) type or of the SOAP (Simple Object Access Protocol) type, providing for a simple coding at the server SUD of requests to the server SDGV in XML (eXtended Markup Language) or Java. These requests are mainly:

an unlock request, requesting the server SDGV to remotely unlock the doors of a car-shared or rental vehicle, which is identified in this request by a manufacturer identifier: VIN (Vehicle Identification Number), and an unprotect request, requesting the server SDGV to remotely authorize the starting of a car-shared or rental vehicle, which is identified in this request by a manufacturer identifier: VIN (Vehicle Identification Number).

Other requests can also be used, notably for allowing a server or several servers such as the server SUD to register with the server SDGV, in order to identify and authenticate these servers, but also in order to:

notify the server SDGV that a vehicle has entered sharing or rental mode, in order to activate certain remote functions of the vehicle, such as the necessity for the starting system for an engine of this vehicle to receive an authorization from the server SDGV in order to start; specifically, when the vehicle is in sharing or rental mode, its immobilizer is protected remotely because the vehicle key or fob is present in the vehicle but made "inert" (by this remote protection) in order that it cannot start the vehicle. The server SDGV will therefore remotely authorize the starting of the vehicle under certain conditions;

notify the server SDGV that a vehicle has left sharing or rental mode, in order to deactivate the abovementioned functions specific to sharing or rental mode;

request the server SDGV to locate a vehicle;

request the server SDGV to remotely lock the doors of a vehicle (in sharing or rental mode);

or to request the server SDGV to prevent the remote starting of a vehicle until it has received an authorization message from the server SDGV (in car-share or rental mode).

The system SYS for making a vehicle available according to the invention allows the user U, by virtue of for example a mobile terminal TM, to book the rental or car-share vehicle V online.

The mobile terminal TM is for example a telephone equipped with a GSM (Global System for Mobile communications) or a UMTS (Universal Mobile Telecommunications System) chip, or a portable computer or a personal digital assistant equipped with Wi-Fi connection means using the standard IEEE 802.11. It allows the user U to use a wireless communication network to exchange data with the server SUD via a web interface. As a variant, the server SUD has voice recognition means enabling communication with the user U via an analog and/or digital telephone connection. In another variant, the user phones an agent of a car-sharing or car rental service who electronically enters the user requests into the server SUD.

The vehicle V includes a communication device TCU for sending data to the server SDGV, and for receiving data from the server SDGV. The data sent by the device TCU is notably the location of the vehicle V, its fuel level if it includes a combustion engine and/or the charge level of a traction battery if it includes an electric engine, its mileage, possible warning messages, the date of the next maintenance service to be carried out, etc. To this end, the communication device TCU includes a GSM or UMTS chip for sending short messages to the server SDGV, which includes a communication interface with the telephone network. As a variant, the communication device TCU communicates by USSD messages (Unstructured Supplementary Service Data) with the server SDGV, or by HTTPS requests over an IP data connection activated for example upon reception of a short message if the communication device TCU includes a third generation communication chip.

The communication device TCU is connected via a CAN (Controller Area Network) data bus to a control system SC of the vehicle V, conditioning the starting of the vehicle V. This control system SC is a computer of the vehicle communicating with other computers of the vehicle such as the main computer of the vehicle, controlling the engine or engines of the vehicle V. The control system SC verifies several conditions before authorizing the starting of the vehicle V. These conditions comprise for example the unlocking of the steering column, the correct start-up of security computers of the vehicle, and the identification of the vehicle ignition key or fob. According to the invention, when the vehicle V is in car-share mode, the control system SC does not authorize the starting of the vehicle until the latter has received from the server SDGV via the communication device TCU:

on the one hand, a first message authorizing the unlocking of the doors of the vehicle V, and on the other hand, a second message different from the first, authorizing the starting of the vehicle V.

With reference to FIG. 2, a method for making the vehicle V available according to the invention is represented in the form of an algorithm including steps E1 to E11.

Most of the steps of this method are implemented, in this embodiment, in a software and/or hardware manner by the system SYS according to the invention, i.e. by one or other of the servers SUD and SDGV. Some steps are implemented by the vehicle V itself.

Step E1 is the reception of a message M1 by the remote user server SUD. This message M1 is a user request sent by the mobile terminal TM, requesting the vehicle V to be made available, which vehicle V has been booked for example during a previous exchange between the user U and the remote user server SUD. If necessary, this user request contains a delay duration chosen by the user U to delay the unlocking of the doors of the vehicle V by this delay duration after the message M1 is received by the server SUD. This duration is for example chosen by the user U on a graphical interface on his/her mobile terminal TM. Thus, the user U chooses for example to unlock the doors 10, 15, 20 or 30 seconds, or even one minute to a few minutes, after the message M1 is sent, in order to allow him/her to join the vehicle V before this unlocking.

The next step E2 is the processing of the user request received in the message M1 by the remote user server SUD. In this step, the remote server SUD identifies and authenticates the user U by his/her telephone number and/or by an identifier and a password to connect to a car-sharing or rental site hosted by the remote server SUD. Then the remote server SUD verifies the availability and condition of the vehicle V before authorizing the user U to use it. It is assumed, in this example embodiment of the invention, that the user U has been identified, authenticated and authorized to use the vehicle V. The user receives if necessary in this step E2, a confirmation of authorization to use the vehicle V from the remote user server SUD.

The next step E3 is the sending of a message M2 by the remote user server SUD to the remote vehicle management server SDGV, possibly upon expiration of the delay duration received at step E1 if such a delay duration was contained in the message M1. This message M2 is an unlock request, requesting the unlocking of the doors of the vehicle V. This request includes the VIN identifier of the vehicle V, but does not include the identifier of the user U, this being managed only by the remote user server SUD. As a variant, the message M2 sent by the remote user server SUD to the remote vehicle management server SDGV contains the delay duration possibly received in the message M1, and it is therefore the remote vehicle management server SDGV which will manage the delay for sending a message M3 at step E4, instead of this delay being managed by the remote user server SUD.

The next step E4 is the sending of a message M3 by the remote vehicle management server SDGV to the communication device TCU of the vehicle V, this message M3 being a request to unlock the doors of the vehicle V. If necessary, this step is conditional upon verification that the user U is less than 500 meters from the vehicle V. Of course, other distance thresholds can be used. To perform this verification, the remote user server SUD locates the mobile terminal TM of the user U, by using for example a location server of a telephone operator, and sends the position of the user U in the message M3. It is to be noted that the remote vehicle management server SDGV knows the position of the vehicle V by virtue of the data sent by the communication device TCU of the vehicle V. As a variant, the verification that the user U is less than 500 meters from the vehicle V is performed by the remote user server SUD, the position of the vehicle V then being sent by the remote vehicle management server SDGV to the remote user server SUD. This geo-locating of the user U and of the vehicle V is of course optional since it requires a good level of positioning precision, the ideal situation being that the user U is equipped with a cellphone with integrated GPS (Global Positioning System). Furthermore, it is not always possible to geo-locate, at least correctly so, the user U, for example if he/she is in a basement.

The next step E5 is the unlocking of the vehicle V, i.e. in practice the electrical unlocking of all its access doors. This step is carried out by the vehicle V itself upon reception of the message M3. Preferably, the vehicle inhibits the visual and/or audible door-unlock indication which is usually implemented when this unlocking is triggered by the ignition key or fob of the vehicle V.

The next step E6 is the sending of a message M4 from the mobile terminal TM to the remote user server SUD. This message M4 includes the value of the mileage of the vehicle V displayed on its instrument panel, the user having entered it on his/her mobile terminal TM and then sent it via a suitable graphical interface requesting the user to enter this data. As a variant, the user can be asked for one or other items of data relating to the vehicle V, instead of the mileage or in addition thereto, by the remote user server SUD or by a software application hosted in the mobile terminal TM. These items of data provide for making sure that the user is definitely in the vehicle or is very close to it when the starting authorization will be given. They are therefore preferably variable, such as the fuel level of the vehicle V or its charge level, but are possibly fixed, such as a license plate number or a barcode specific to the vehicle. An item of fixed data relating to the vehicle has however the drawback of being able to be obtained remotely from the vehicle and in advance, since it does not vary from one use to another of the same vehicle. An item of random data displayed by a multimedia screen in the vehicle forms for this reason a more secure item of data relating to the vehicle insofar as this value can be generated each time the vehicle V is made available by the server SDGV. In this embodiment of the invention, the mileage value of the vehicle is chosen to be the value to be entered by the user U at this step E6. This provides for making sure that the user U has manually opened the vehicle, and retrieved the key or fob of the vehicle in order to switch on the instrument panel of the vehicle, which is a necessary condition to obtain this mileage value. Thus, this provides confidence that starting will then be authorized only while the user U has definitely found the vehicle and is seated therein.

The next step E7 is the sending of a message M5 from the remote user server SUD to the remote vehicle management server SDGV. This message M5 is an unprotect message, i.e. an unprotect request giving an authorization to start the vehicle V. This request includes the VIN identifier of the vehicle V as well as the mileage received in the message M4, but does not include the identifier of the user U, this being managed only by the remote user server SUD.

The next step E8 is the verification by the remote vehicle management server SDGV of the validity of the mileage received at step E7, by comparing this mileage to the last mileage value sent to the server SDGV by the communication device TCU. This step validates the fact that the user U has definitely manually opened a door of the vehicle V, since the mileage is available only after the instrument panel is switched on.

If at this step E8, the remote server SDGV observes that the mileage value received in the message M5 is not valid, or if the remote server SDGV receives a message from the communication device TCU notifying it of the fact that the vehicle V has become locked again, then the method proceeds to step E11, otherwise the method proceeds to step E9. Specifically, it is to be noted that the vehicle V automatically re-locks the doors of the vehicle when no manual opening of the doors is detected two minutes after a purely electric unlocking.

Step E11 consists of new exchanges between the user U and the remote server SUD, after a failure to proceed to step E9, i.e. if the remote vehicle management server SDGV could not send a message authorizing the starting of the vehicle to the communication device TCU. For the user U, this exchange consists in re-requesting the vehicle V to be made available via a new request to the remote user server SUD, which will result in the sending of new messages M2 to M5 and in a new verification of the mileage of the vehicle according to steps E3 to E8 which will be re-executed. These new exchanges are either on the initiative of the user who observes that the doors of the vehicle V have been re-locked, or on the initiative of the remote user server SUD if it has been notified at step E8 by the remote vehicle management server SDGV of the failure to proceed to step E9. In this latter case, the remote user server SUD sends for example a message to the user U on his/her mobile terminal TM notifying him/her of the procedure to be followed. It is to be noted that the communication device TCU does not necessarily inform the remote vehicle management server SDGV of the re-locking of the doors of the vehicle V, this feature being optional. It is therefore necessary for the user interface displayed on the mobile terminal TM to be intuitive such that the user U resends a request to make the vehicle V available when he/she observes that the vehicle V has not been unlocked.

Step E9 is the sending of a message M6 by the remote vehicle management server SDGV to the communication device TCU of the vehicle V, this message M6 being an authorization to start the vehicle V.

The next step E10 is the authorization to start the vehicle V, which authorization is given by the control system SC to at least one of the engines of the vehicle V. This step E10 takes place after the communication device TCU has received the messages M3 and M6, and after the ignition key or fob of the vehicle V is identified/authenticated, and after other starting criteria are verified. When the communication device TCU receives the message M6, it transmits to the control system SC this starting authorization given by the remote vehicle management server SDGV.

Preferably, the message exchanges between the user U and the remote user server SUD, between the remote user server SUD and the remote vehicle management server SDGV, between the remote vehicle management server SDGV and the communication device TCU, and between the communication device TCU and the control system SC, are encrypted. Furthermore, the entities of this series of exchanges are mutually identified and authenticated before each message exchange. Thus, the control system SC authorizes the starting of the vehicle V only after the communication device TCU is authenticated, this device having itself authenticated the remote vehicle management server beforehand. These authentications use for example conventional public key or private key, symmetric or asymmetric encryption systems.

At the end of step E10, the method proceeds to a usage phase of the vehicle V by the user U, who is then capable of starting the vehicle V and using it.

When the user U wishes to return the vehicle, after a phase of use, he/she must verify, in a step E12 represented in FIG. 3, that the remote vehicle management server SDGV can communicate with the communication device TCU, i.e. that the communication network used by the communication device TCU is available at the vehicle V.

It is to be noted that this communication network is not necessarily the same as that used by the mobile terminal TM to communicate with the remote user server SUD, and that on the other hand the user U is guided in the release procedure of the vehicle by an intuitive interface that can be used on his/her mobile terminal TM. This interface is the interface of the rental or car-sharing web service implemented in the remote user server SUD, but the implementation of this interface can be distributed between the mobile terminal TM and the remote user server SUD.

To verify the availability of the communication network used by the communication device TCU, the user U looks on a multimedia interface of the vehicle V to see whether a network availability indicator is present. If this indicator is present, he/she informs the remote user server SUD of this via his/her mobile terminal TM. If this indicator is not present, the user U must move the vehicle V to a place where the communication network used by the communication device TCU is available at the vehicle V.

As a variant, or for example if the vehicle V does not have a multimedia interface capable of displaying a network availability indicator, upon reception of a release request sent by the user U, the remote user server SUD sends a request to the server SDGV which sends a test message to the communication device TCU. If the communication device TCU responds to the server SDGV, then the latter informs the remote user server SUD of this and the method proceeds to the next step E13, otherwise the remote user server SUD requests the user U to move the vehicle V to a place where the network is available for the communication device TCU, and step E12 is repeated.

Step E13 is an inventory step of the vehicle, performed by the user U. For this purpose, the user U uses a graphical interface on his/her mobile terminal TM, which enables him/her to easily fill in a list of points to confirm or to enter, such as the presence of the vehicle papers in the glove box, the good condition of the vehicle, a parking space number for the vehicle, etc. The graphical interface also allows him/her to insert photos of damaged parts of the vehicle, and to point out a damaged area of the vehicle on a three-dimensional model of the vehicle. Once the inventory is validated on the graphical interface, it is sent to the remote server SUD. Other message exchanges between the remote server SUD and the user are if necessary implemented if the inventory is incomplete. If necessary, the user is placed in communication with a call center if the inventory results in reporting problems preventing the release of the vehicle.

In this step E13, the conditions required to finalize the inventory of the vehicle V comprise in one variant the new value of the mileage of the vehicle V. This is because, in this variant, the verification of the value of the mileage provided by the user at step E6 in the message M4 is not carried out by the remote vehicle management server SDGV but by the remote user server SUD. In this variant, steps E8 and E7 are therefore switched since it is the remote user server SUD which validates the fact that the user has definitely manually opened at least one of the doors of the vehicle V.

The next step E14 is the remote protecting of the vehicle V. In this step E14, the remote vehicle management server SDGV receives a protect request from the remote user server SUD requesting it to remotely protect the vehicle V. Upon receiving this request, the remote vehicle management server SDGV sends to the communication device TCU a message inhibiting the starting of the vehicle V, i.e. the starting of the vehicle V will require the reception of a new authorization message such as the message M6 at step E9.

The next step E15 is the remote locking of the vehicle V. In this step E15, the remote vehicle management server SDGV receives a lock request from the remote user server SUD requesting it to remotely lock the vehicle V. As a variant, reception of this lock request is unnecessary for the remote vehicle management server SDGV to carry out the remote lock step E15 for the vehicle V.

The remote vehicle management server SDGV then verifies that the key or fob of the vehicle V is definitely in the passenger compartment by querying the communication device TCU. The latter communicates with a computer in the vehicle, itself connected to a fob detector or to a key detector. It is to be noted that some vehicles are not equipped with key detectors. In that case, verifying the presence of the key in the passenger compartment is managed by the remote user server SUD which carries out this verification by querying the user U, for example before the lock request is sent.

If in this step E15, the presence of the key or fob in the passenger compartment is confirmed by the remote vehicle management server SDGV or the remote user server SUD, then the remote vehicle management server SDGV sends a message to the communication device TCU requesting it to lock the vehicle V. If the doors of the vehicle have definitely been manually shut, the vehicle V then locks its doors and the method proceeds to step E16. Otherwise, if the presence of the key or fob in the passenger compartment is invalidated, or if a door is not properly shut, the user U is informed via his/her mobile terminal TM that the vehicle cannot be released due to the absence of the key in the passenger compartment, or due to a door not shut properly, and step E15 is repeated.

Step E16 is the release of the vehicle, which is conditional upon steps E12 to E15 having proceeded correctly. The server SUD stops the charging of the car-sharing or rental service for the user U.

It is to be noted that embodiments of the system for making a vehicle available according to the invention, and of the method for making a vehicle available according to the invention, other than the one described in this application can be envisaged. Notably, steps E1 to E16 described in this embodiment are not all indispensable to implement the invention, and some of these steps, or the way in which they are ordered, can be implemented differently. For example, steps E12 to E16 are able to not be implemented, or the vehicle V can itself automatically upload an inventory of the vehicle to the server SDGV, lock its doors and prohibit the starting of the vehicle as soon as it detects, after a request to release the vehicle by the user:
- a stopping of the engine or engines of the vehicle,
- the presence of the ignition key or fob of the vehicle in the glove box,
- no presence in the passenger compartment,
- and the manual closure of the vehicle doors.

Likewise, the mileage value verification sent by the user U to the remote user server SUD is as a variant carried out by the remote user server SUD itself and not by the remote vehicle management server SDGV.

The invention claimed is:

1. A method for making a vehicle available for a user to use the vehicle, comprising:
   identifying, via a remote user server, the user and authorizing the use of the vehicle by the user upon reception of a user request;
   sending, via a remote vehicle management server in communication with the remote user server and once the user is authorized, a message to unlock at least one door of the vehicle;
   sending, from the remote vehicle management server, another message, independent of the message to unlock the at least one door, authorizing starting of an engine of the vehicle by a control system of the vehicle; and
   allowing, by the control system of the vehicle, the user to use the vehicle;
   wherein the remote user server is separate from the remote vehicle management server,
   wherein the remote user server sends an unlock message to unlock the at least one door of the vehicle and an unprotect message to authorize the starting of the engine of the vehicle by the control system of the vehicle to the remote vehicle management server prior to the sending of the message and another message.

2. The method for making a vehicle available as claimed in claim 1, wherein
   the message to unlock the at least one door is sent by the remote vehicle management server to the vehicle upon reception of the unlock message sent by the remote user server after processing the user request by the remote user server,
   the message authorizing the starting of an engine of the vehicle is sent by the remote vehicle management server to the vehicle upon reception of the unprotect message sent by the remote user server, the unlock and unprotect messages sent by the remote user server to the remote vehicle management server do not include an identifier of the user.

3. The method for making a vehicle available as claimed in claim 2, wherein the remote vehicle management server sends the another message authorizing the starting of the engine of the vehicle when the remote user server has received from the user a value of a variable parameter relating to the vehicle, and the value corresponds to a value previously recorded by the remote vehicle management server or by the remote user server.

4. The method for making a vehicle available as claimed in claim 2, wherein the remote user server does not authorize a release of the vehicle by the user until the remote user server:
 detects availability of a communication network allowing the vehicle to communicate with the remote vehicle management server, and/or receives an inventory validation message from the user.

5. The method for making a vehicle available as claimed in claim 2, further comprising:
 booking the vehicle by the user, during which the user supplies to the remote user server a value for delaying by a predetermined duration the sending of the message allowing the unlocking of the at least one door of the vehicle.

6. The method for making a vehicle available as claimed in claim 1, wherein the control system of the vehicle authorizes the starting of the engine of the vehicle when a key or a fob of the vehicle is identified, and after the vehicle receives the message and another message allowing the unlocking of the at least one door and authorizing the starting of the engine of the vehicle.

7. The method for making a vehicle available as claimed in claim 1, wherein the remote vehicle management server sends the another message authorizing the starting of the engine of the vehicle after detecting a manual opening of the at least one door of the vehicle.

8. The method for making a vehicle available as claimed in claim 1, wherein the sending of the message to unlock the at least one door of the vehicle takes place after determining a distance between the user and the vehicle, and when the distance determined during the determination is less than a predetermined threshold.

9. The method for making a vehicle available as claimed in claim 1, wherein upon reception by the vehicle of the message to unlock the at least one door of the vehicle, the vehicle inhibits a visual and/or audible door-opening indicating function.

10. A system for making a vehicle available for a user to use the vehicle, comprising:
 a remote user server configured to identify the user and to authorize the use of the vehicle by the user upon reception of a user request; and
 a remote vehicle management server configured to:
  communicate with the remote user server,
  send to the vehicle a message to unlock at least one door of the vehicle in response to reception of an unlock message sent by the remote user server, and
  send to the vehicle another message independent of the message allowing the unlocking, authorizing starting of an engine of the vehicle by a control system of the vehicle, upon reception of an unprotect message sent by the remote user server, and
  allow, by the control system of the vehicle, the user to use the vehicle,
 wherein the remote user server is separate from the remote vehicle management server,
 wherein the remote user server sends an unlock message to unlock the at least one door of the vehicle and an unprotect message to authorize the starting of the engine of the vehicle by the control system of the vehicle to the remote vehicle management server prior to the sending of the message and another message.

11. A non-transitory computer readable medium having computer-readable instructions stored thereon which when executed by a processor cause the processor to perform a method for making a vehicle available for a user to use the vehicle, the method comprising:
 identifying, via a remote user server, a user and authorizing the use of the vehicle by the user upon reception of a user request;
 sending, via a remote vehicle management server in communication with the remote user server and based on the authorization, a message to unlock at least one door of the vehicle;
 sending, via the remote vehicle management server, another message, independent of the message to unlock the at least one door, authorizing starting of an engine of the vehicle by a control system of the vehicle; and
 allowing, by the control system of the vehicle, the user to use the vehicle,
 wherein the remote user server is separate from the remote vehicle management server,
 wherein the remote user server sends an unlock message to unlock the at least one door of the vehicle and an unprotect message to authorize the starting of the engine of the vehicle by the control system of the vehicle to the remote vehicle management server prior to the sending of the message and another message.

* * * * *